July 31, 1934.    B. E. GAUNT    1,968,384
SHAPING MEANS
Filed Sept. 28, 1931    2 Sheets-Sheet 1

Benjamin E. Gaunt
INVENTOR

WITNESS

BY
ATTORNEY

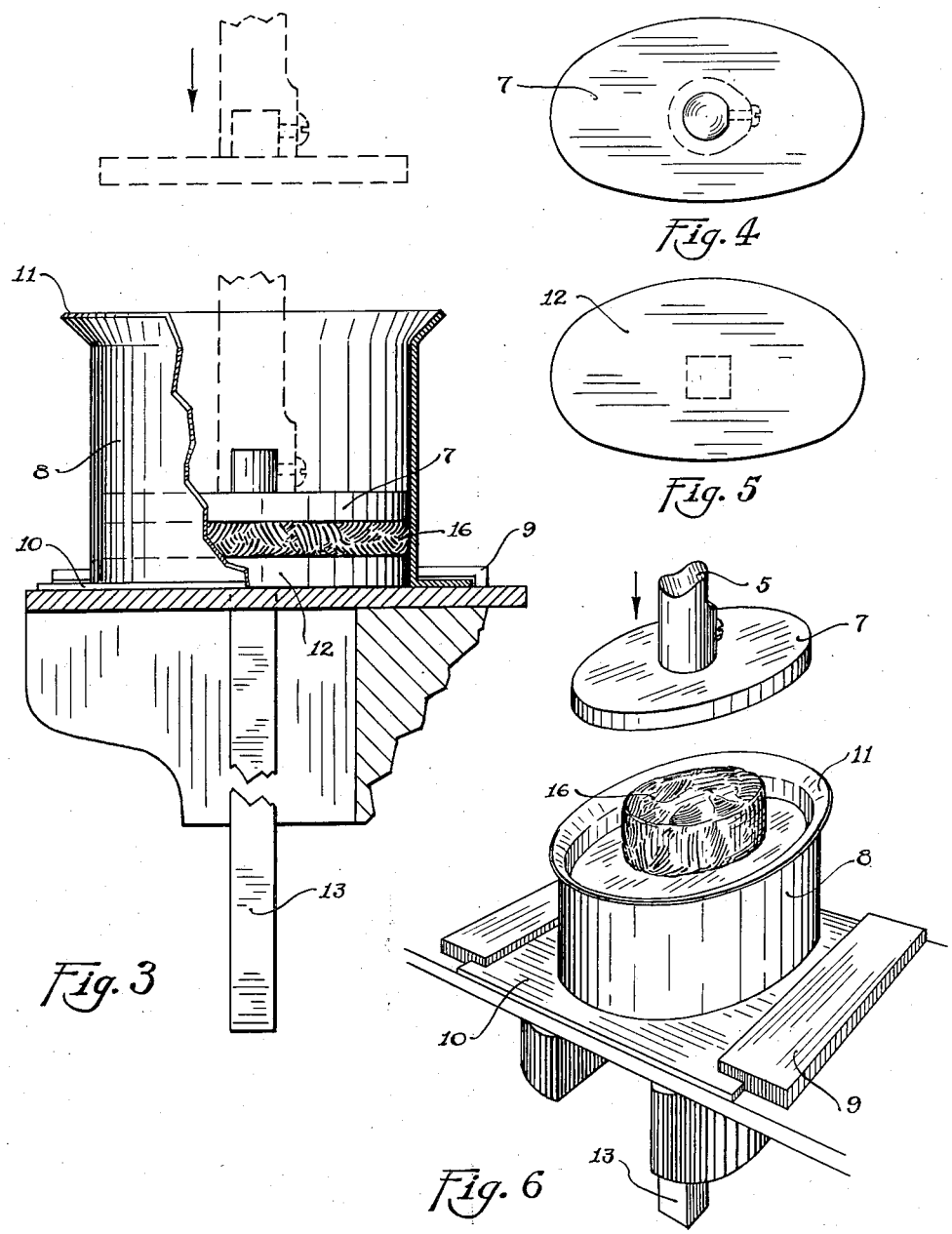

Patented July 31, 1934

1,968,384

UNITED STATES PATENT OFFICE

1,968,384

SHAPING MEANS

Benjamin E. Gaunt, Chicago, Ill., assignor to Swift and Company, Chicago, Ill., a corporation of Illinois Application September 28, 1931, Serial No. 565,461

2 Claims. (Cl. 17—32)

The invention relates to the preparation of meat for market and to the apparatus hereinafter disclosed and shown in the drawings hereto attached.

In the operation of the apparatus a tenderloin steak or other piece of meat, is subjected to pressure in a box or mold whereby it assumes a predetermined outline and uniform thickness. The steak or other cut of beef is of given weight, hence, the product is steaks of uniform size and weight.

The apparatus consists of a press embodying a base, an upright on the base having an overhanging portion, a mold or compression box removably mounted on the base, a plunger co-ordinate with the mold and having a stem provided along a side with teeth and mounted in the overhanging portion of the upright for vertical movement, a power shaft mounted in the overhanging portion of the upright and provided with a gear wheel in mesh with the teeth of the plunger stem, an ejecting plate in the bottom of the mold, a rod associated with the ejecting plate and operable through the base and bottom of the mold and adapted to be actuated by the said power shaft through the plunger stem, and means connected thereto, all as will more fully appear from the following description and accompanying drawings.

For a full understanding of the invention and the merits thereof, reference is to be had to the drawings hereto attached and the subjoined description in which corresponding parts are designated in the several views of the drawings and referred to in the specification by like reference characters.

In the drawings:—

Fig. 3 is an enlarged view of the mold or compression box partly in section showing a cut of meat compressed therein.

Fig. 4 is a plan view of the plunger.

Fig. 5 is a plan view of the ejecting plate.

Fig. 6 is a fragmentary view in perspective of the mold or compression box, supporting base therefor, and plunger showing a cut of beef in position prior to being subjected to compression.

Figures 1, 2:
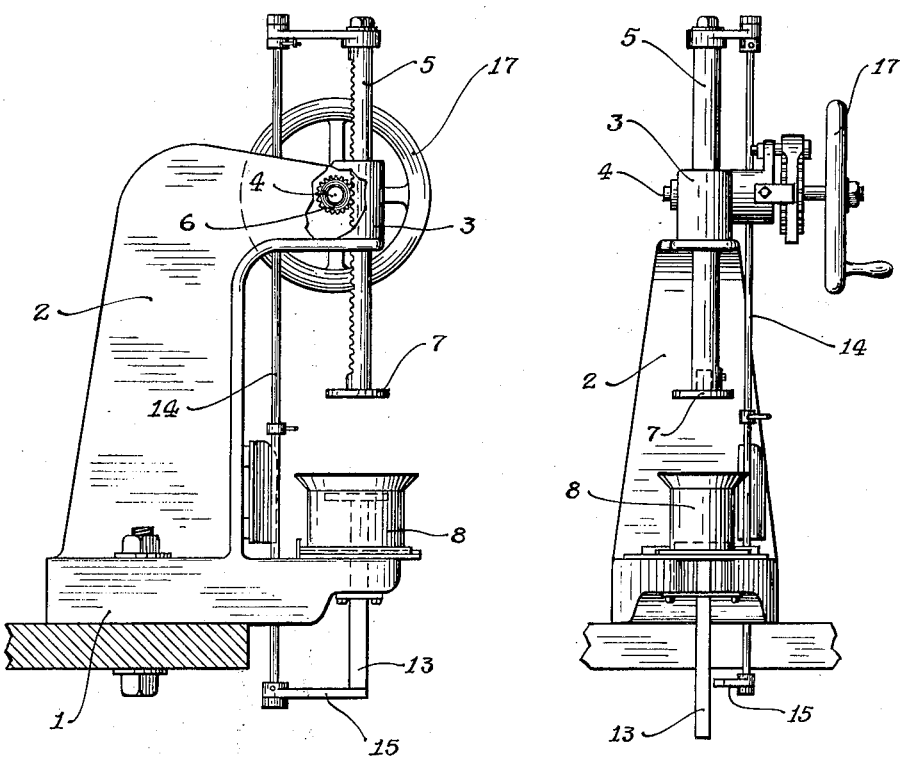
Fig. 1 is a side view of a meat press illustrative of an embodiment of the invention.
Fig. 2 is a front view of the parts shown in Fig. 1.

The numeral 1 designates a base forming supporting means for the operating parts. An upright 2 is mounted upon the base 1 and is formed with an overhanging portion 3 in which is mounted a power shaft 4 and stem 5, the latter being provided along a side with teeth which are in mesh with a gear wheel 6 fast to the power shaft 4. A plunger 7 is detachably connected to the lower end of the stem 5 and moves vertically therewith.

A mold or compression box 8 is removably mounted upon the base 1 and is of a size and shape conformable to the shape of the steak to be formed. Guides 9 are provided upon the base 1 and the mold 8 has a plate 10 affixed to its lower end which is adapted to slidingly engage the guides 9 to admit of ready detachment of the mold when required. A flared rim 11 is provided at the upper end of the mold or compression box 8 and facilitates the placing of the cut of meat in position and also functions as a guide to direct the plunger 7 when entering the mold.

An ejecting plate 12 is placed upon the bottom of the mold 8 and the cut of meat to be compressed is confined between the plate 12 and plunger 7, as indicated most clearly in Fig. 3 of the drawings. A stem 13 is operable through the base 1 and bottom of the mold 8 and when elevated lifts the plate 12 and the steak thereon. The stem 13 is adapted to be operated by means of the power shaft 4 through intermediate connections associated with the plunger and stem 5.

These connections may be of any determinate construction and include a rod 14 or like part and a cross piece 15 which is disposed in the path of the stem 13 so that when the cross piece 15 is elevated and engages the stem 13, the ejecting plate 12 is lifted and elevates the steak 16 thereon. This takes place when the plunger 7 is elevated, as shown most clearly by the dotted lines in Fig. 3.

It will be noted that rod 14 is rotatable in its bearings whereby by rotation of rod 14, cross piece 15 may be positioned under the end of stem 13 in operative relationship therewith to elevate and lower said stem 13 and its plunger 7, and likewise may be positioned out of relationship with stem 13 when it is not desired to elevate said stem 13.

In accordance with the invention a cut of beef or tenderloin of given weight is placed within the mold or compression box 8, after which the plunger 7 is lowered by operating the shaft 4 through a hand wheel 17 or other convenient means. As the plunger 7 descends the cut of beef is subjected to compressive force which spreads and conforms the same to the shape of the mold or compression box. As a result the steak assumes a given outline and uniform thickness. Upon reversing the rotation of the shaft 4 the plunger 7 is elevated and when near the limit of its upward movement the cross piece 15 comes in contact with the stem 13 and elevates the ejecting plate 12, with the result that the steak or compressed meat is lifted to a position for convenient and ready removal from the mold. It will be understood that the steaks thus resulting are of uniform size and weight and may be advantageously packaged for market.

What is claimed is:

1. In a meat shaping press, a main frame comprising a base member with an outwardly extending portion for supporting a mold or box, said base member provided with guides, and an upright providing a portion overhanging the outwardly extending box-supporting portion of the base, a hollow mold or compression box having a plate affixed to its lower end whereby it may be removably mounted on the outwardly extending box-supporting portion in engagement with said guides, a plunger coordinated with the mold so as to move vertically downwardly within the mold during a pressing operation and shaped so as to extend substantially across the entire area of the mold interior, a stem slidably mounted for vertical movement in the overhanging portion of the support, the plunger being detachably secured to the stem at the lower end of the latter, means carried by the upright and cooperatively related with the stem for forcibly moving the stem and, therefore, the plunger downwardly to effect a pressing operation and for thereafter lifting the stem and plunger, an ejector plate mounted within and extending substantially across the entire area at the lower interior portion of the mold and supported so as to provide a mold bottom during the pressing operation, said ejector plate having a depending member whereby when said depending member is lifted, material pressed within the mold can be lifted by the ejector plate preparatory to the complete removal of the material from the press, a depending member connected to the plunger stem and carried thereby, and positionable means carried by one of said depending members whereby the positionable means when in one position will allow movement of the pressing plunger downwardly during a meat-pressing operation while the ejector plate is remaining stationary and thus providing the bottom of the mold, but which positionable means is constructed so that, when in another position, the ejector plate is lifted as the pressing means moves through the final portion of its upward return movement.

2. A meat shaping press as per claim 1, in which the depending member that is connected to the plunger stem is carried from and by the plunger stem in such a manner that the depending member can have angular movement about a vertically extending axis and is provided intermediate its ends with a handle for effecting said angular movement and at its lower end with a swinging arm for providing the positionable means by which the ejector plate is lifted when the positionable means is moved so that it engages the underside of the member depending from the ejector plate during the latter portion of the upward movement of the plunger stem.

BENJAMIN E. GAUNT.